US006856384B1

(12) United States Patent
Rovira

(10) Patent No.: US 6,856,384 B1
(45) Date of Patent: Feb. 15, 2005

(54) OPTICAL METROLOGY SYSTEM WITH COMBINED INTERFEROMETER AND ELLIPSOMETER

(75) Inventor: Pablo I. Rovira, San Francisco, CA (US)

(73) Assignee: Nanometrics Incorporated, Milpitas, CA (US)

( * ) Notice: Subject to any disclaimer, the term of this patent is extended or adjusted under 35 U.S.C. 154(b) by 231 days.

(21) Appl. No.: 10/016,943

(22) Filed: Dec. 13, 2001

(51) Int. Cl.[7] .................................................. G01B 9/02
(52) U.S. Cl. .................................... 356/73; 356/517
(58) Field of Search .............................. 356/517, 512, 356/513, 514, 489, 495, 72, 73

(56) References Cited

U.S. PATENT DOCUMENTS

| 5,329,357 | A | | 7/1994 | Bernoux et al. | 356/369 |
|---|---|---|---|---|---|
| 5,485,271 | A | * | 1/1996 | Drevillon et al. | 356/491 |
| 5,583,639 | A | * | 12/1996 | Rostvall | 356/512 |
| 5,777,740 | A | * | 7/1998 | Lacey et al. | 356/495 |
| 5,793,480 | A | | 8/1998 | Lacey et al. | 356/73 |
| 5,877,859 | A | | 3/1999 | Aspnes et al. | 356/364 |
| 6,275,297 | B1 | | 8/2001 | Zalicki | 356/496 |
| 6,580,515 | B1 | * | 6/2003 | Li et al. | 356/516 |
| 6,633,831 | B2 | | 10/2003 | Nikoonahad et al. | 702/155 |

OTHER PUBLICATIONS

Hart, M. et al., "Stroboscopic Interferometer System for Dynamic MEMS Characterization" *Journal of Microelectromechanical Systems*, vol. 9, (2000) pp. 409–418.

F. Abeles, "Methods for Determining Optical Parameters of Thin Films" in Progress in Optics, vol. II, E. Wolf, Ed. (North Holland Publishing, Amsterdam, 1963), pp. 248–288.

* cited by examiner

*Primary Examiner*—Samuel A. Turner
(74) *Attorney, Agent, or Firm*—Silicon Valley Patent Group LLP

(57) ABSTRACT

An interferometer and ellipsometer are combined in a metrology tool to measure the step height of a sample, which may include transparent layers. The metrology tool includes a shared light source that provides a light beam for an interferometer and a light beam for an ellipsometer, interferometer optics which direct the light beam for an interferometer to reflect off of a sample and ellipsometer optics which direct the light beam for an ellipsometer to reflect off a sample, and a detector element for receiving both the reflected light beam for an interferometer and the light beam for an ellipsometer. The light source may produce a single beam that is split into an interferometer and an ellipsometer beam with a beam splitter. In another embodiment, the interferometer and ellipsometer may share at least one of a polarizer, analyzer, or detector element.

25 Claims, 8 Drawing Sheets

(Conventional)

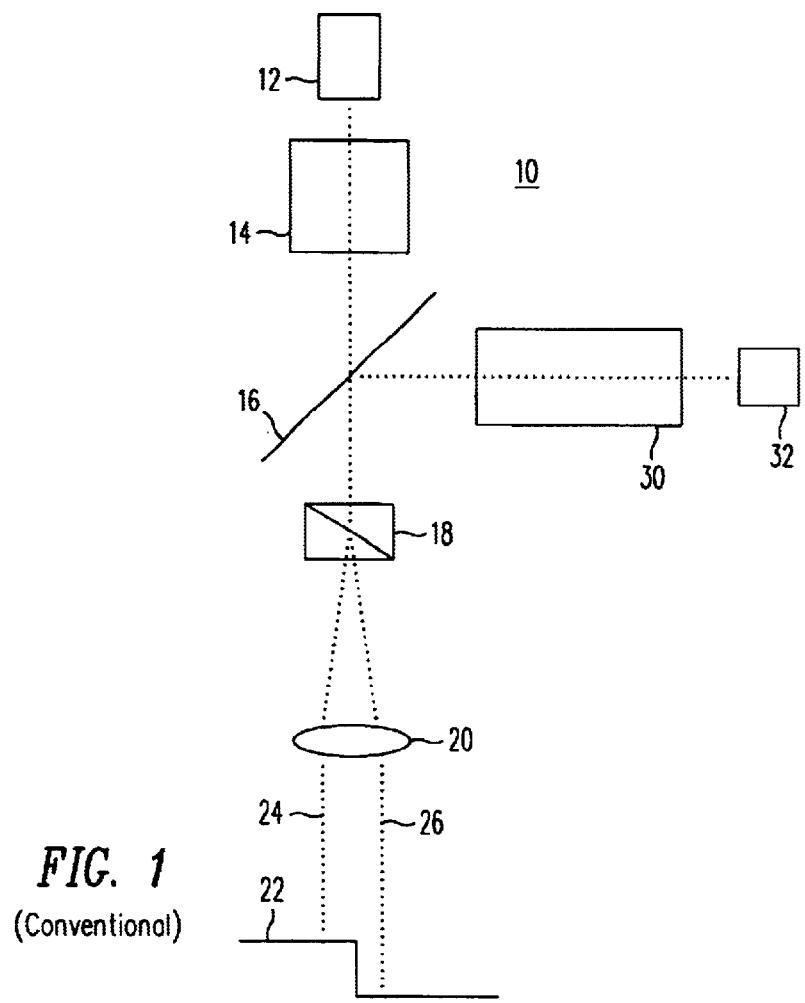
FIG. 1
(Conventional)
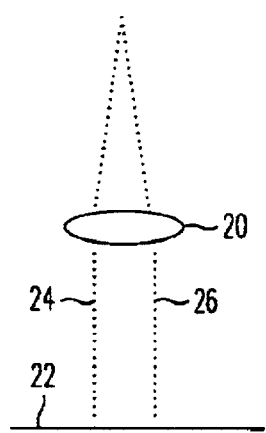
FIG. 3A
(Conventional)
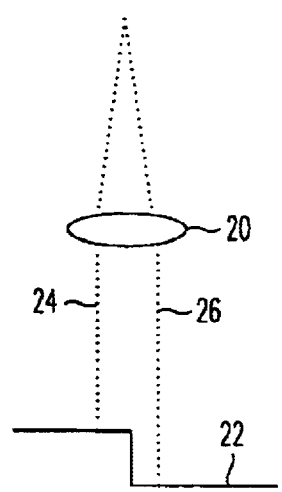
FIG. 3B
(Conventional)

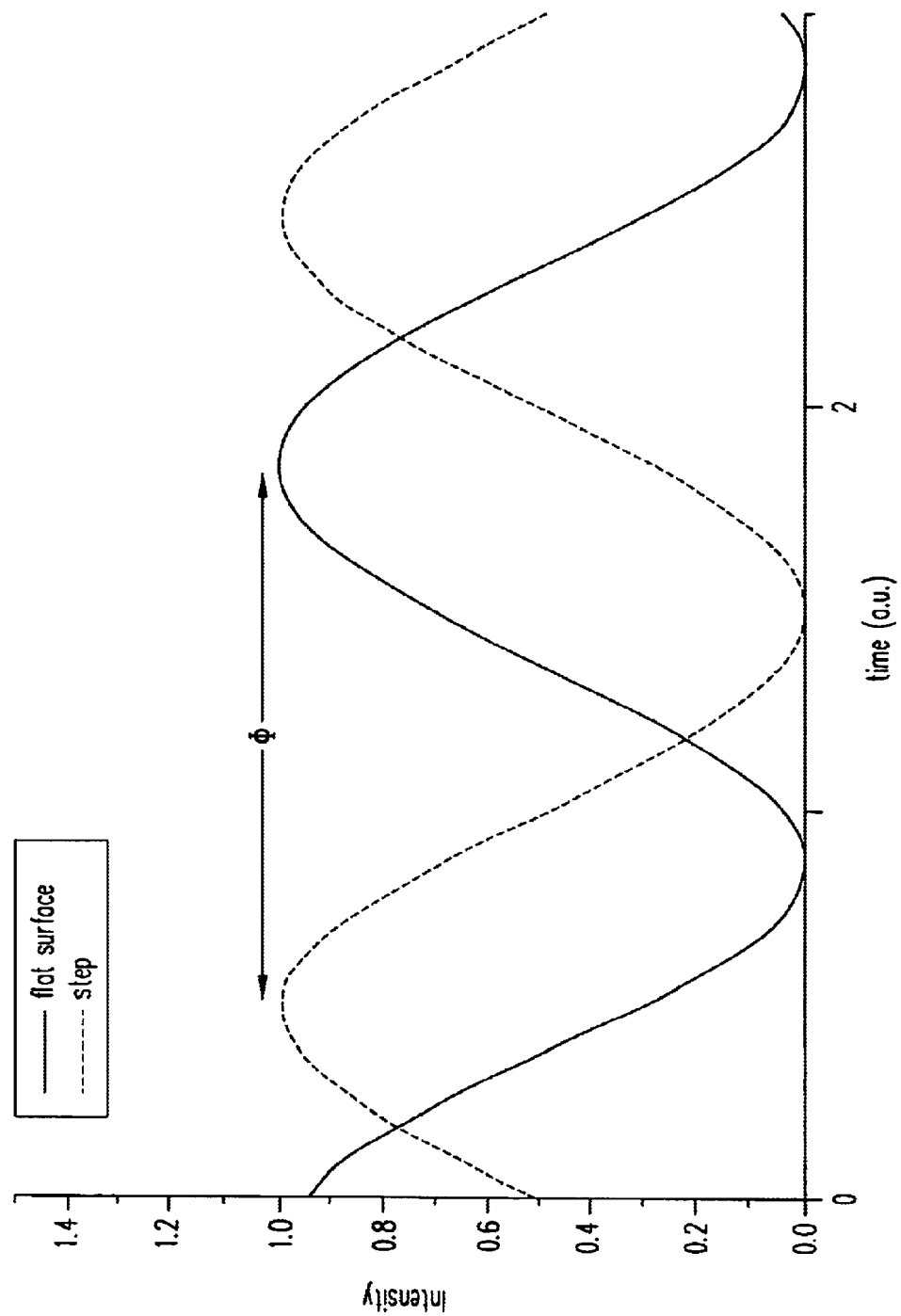
FIG. 2
(Conventional)

OPTICAL METROLOGY SYSTEM WITH COMBINED INTERFEROMETER AND ELLIPSOMETER

FIELD OF THE INVENTION

The invention relates to an optical measurement instrument, and more particularly to a metrology tool with an interferometer and an ellipsometer to measure the step height of a sample.

BACKGROUND

Differential interferometers are well known in the art as metrology tools useful in a variety of scientific and technological fields, for example, biology, geology, forensics, nutrition science, medicine, and semiconductor processing. Differential interferometers are instruments that measure the step height between two regions on a sample or the surface profile of a sample by measuring the interference of an electromagnetic beam reflected from the two different heights.

FIG. 1 is a schematic representation of a conventional interferometer 10. As shown in FIG. 1, the interferometer 10 includes a laser light source 12 that generates a collimated monochromatic light beam. Modulator 14 then modulates the light polarization state at a frequency $\Omega$, and consists of a rotating polarizer or a polarizer and elastic modulator combination. The light then passes through a beam splitter 16 and is divided by a Wollaston prism 18 into two components, s and p. A lens 20 is positioned to focus the two beams on the surface to be measured, e.g., step surface 22. The beams are reflected back through the lens 20 and recombined by the Wollaston prism 18 before being deflected by beam splitter 16 through polarizer 30 (analyzer) and to detector 32. A conventional metrology tool 10 may include other various systems such as auto-focusing and viewing optics (not shown).

Detector 32 measures the intensity of the light as a function of time as shown in FIG. 2. The phase change $\Omega_h$, of this function from a measurement of a flat region and a step region, as shown in FIG. 3A and 3B, is proportional to the height of the step as given by equation:

$$h = \frac{4\pi}{\lambda}\varphi_h \qquad \text{eq. 1}$$

where h is the height of the step, and $\lambda$ is the wavelength of the light. However, if the material on top of the step is different from the material on the bottom of the step, e.g., the top can be a stack of transparent layers, whereas the bottom can be metal, the wavelengths are reflected in different phases due to of the different complex reflectivity coefficients of the two different materials. This difference must be taken into consideration when calculating an accurate step height of the sample. Therefore, the phase $\theta$, measured by the interferometer when the material on the top and bottom of the step differ becomes:

$$\theta = \phi_h + \phi_{mat1} + \phi_{mat2} \qquad \text{eq.2}$$

where $\phi_{mat1}$ and $\phi_{mat2}$ are the phase values due to the reflectivity coefficients of the material on the top of the step, material 1, and the material on the bottom of the step, material 2, and $\phi_h$ is the phase difference due to the height of the step. Therefore, because the step height is desired, it becomes necessary to determine the reflectivity coefficients of the two materials.

An interferometry measurement would be sufficient without determining the reflectivity coefficients of the two materials if there were an external absolute reference, for example, where one of the beams is reflected back from a mirror, as in a Michelson interferometer. However, the disadvantage of using an external absolute reference in a metrology system is that such systems invariable suffer from a high degree of sensitivity to vibration.

Another proposed approach to measure the reflectivity coefficients is the use of a spectroscopic reflectometer. The reflectance spectrum can be analyzed to determine the structure and optical properties of the measured material, and this information can produce an optical model to calculate the phase quantities. A disadvantage of this approach is that completely different equipment or hardware is required to measure $\phi_{mat1}$ and $\phi_{mat2}$, thus increasing the cost and complexity of the step height metrology system.

The use of multiple instruments in many industries, such as semiconductor manufacturing, is undesirable because of the high fabrication and maintenance costs of clean rooms or other operation environments. Further, the use of multiple instruments creates time-consuming transfer of samples from one instrument to another and reduces the accuracy of the instruments because it is difficult for multiple instruments to measure from the exact same area of the samples.

Furthermore, a reflectometer is a tool that is not sensitive to phase. The process of indirectly determining $\phi_{mat1}$ and $\phi_{mat2}$ by reproducing the structure from a reflectance spectrum may propagate systematic errors.

Thus, in general a metrology tool that can accurately measure the step height of a sample, including a transparent layer or two different materials, is desired. Further, a decrease in the size of the metrology tool as well as reducing the cost and maintenance associated with the metrology tool is desired.

SUMMARY

According to one embodiment of the present invention, a metrology tool used to measure the step height of a sample includes an interferometer and an ellipsometer combination. The metrology tool includes a shared light source that provides a light beam for an interferometer and a light beam for an ellipsometer, interferometer optics which direct the light beam for an interferometer to reflect off the sample and ellipsometer optics which direct the light beam for an ellipsometer to-reflect off the sample, and a detector element for receiving both the reflected light beam for an interferometer and the light beam for an ellipsometer.

The interferometer optics may include, e.g., a polarization state generator, and a Wollaston prism. The ellipsometer optics may include, e.g., a polarization state generator and polarization state detector. The interferometer optical path and ellipsometer optical path may consist of free space optics or non-free optics, such as fiber optics or waveguides.

The metrology tool may include a beam splitter that splits a single light beam produced by the light source into the light beam for an interferometer and the light beam for an ellipsometer. In an other embodiment, the single light beam is directed to become the light beam for an interferometer and light beam for an ellipsometer by a moveable mirror. In another embodiment, the single light source may also be directed by an optical coupler to form the light beam for an interferometer and light beam for an ellipsometer.

The reflected light beam for an interferometer and reflected light beam for an ellipsometer may be directed to the detector element by a beam splitter. In another embodiment, an optical coupler directs the reflected light beam for an interferometer and reflected light beam for an ellipsometer to the detector.

The interferometer-ellipsometer combination may further share a number of components including the shared light source. They may further share any combination of a polarizer, analyzer, detector, and beam splitter or variable retarder.

According to another embodiment of the invention, a metrology tool with an interferometer and an ellipsometer is provided with means for producing a light beam for an interferometer, means for producing a light beam for an ellipsometer, interferometer optics for directing the light beam for an interferometer on a sample and ellipsometer optics for directing the light beam for an ellipsometer on a sample, and means for receiving the reflected interferometer and ellipsometer beams.

According to another embodiment of the invention, a method of measuring the step height of a sample, which may include transparent layers, is provided. The method includes producing a light beam for an interferometer and a light beam for an ellipsometer, reflecting the interferometer and light beam for an ellipsometers off a sample, and receiving the light beams at a detector element The present invention is better understood upon consideration of the detailed description below and the accompanying drawings.

BRIEF DESCRIPTION OF THE DRAWINGS

FIG. 1 shows a conventional metrology tool, including an interferometer.

FIG. 2 is a graphical representation of the intensity of the light reflected from a sample over time.

FIGS. 3A and 3B are cross-sectional views of a sample that is flat and one that has a step respectively, which is being measured by a differential interferometer.

In the present disclosure, like objects, which appear in more than one figure, are generally provided with like reference numerals.

DETAILED DESCRIPTION

A metrology tool, in accordance with an embodiment of the present invention, includes an interferometer-ellipsometer combination to accurately measure the step height between two regions on a sample or the profile of a surface region of a sample. With the use of an interferometer and an ellipsometer, step heights that include transparent layers or different materials may be advantageously measured. The metrology tool includes a shared light source that is used for an interferometer and an ellipsometer, interferometer optics that direct the interferometer beam to reflect off the sample and ellipsometer optics that direct the ellipsometer beam to reflect off the sample. The interferometer optics may include, e.g., polarization state generator, and a Wollaston prism. The ellipsometer optics may include, e.g., polarization state generator and polarization state detector. The interferometer optical path and the ellipsometer optical path may consist of free space optics or non-free optics, such as fiber optics or waveguides.

Because the metrology tool, in accordance with the present invention, shares many of the same components, the size and cost of the metrology tool is decreased relative to conventional systems. Further, because there are fewer parts than two separate metrology tools, the cost of materials and labor in manufacturing is reduced. Moreover, with fewer parts, the maintenance and calibration of the device is simplified while reliability is improved Thus, the single light source and sharing of other components, the size, complexity, and cost of the metrology tool are reduced considerably, without sacrificing performance and accuracy.

Figure 4:
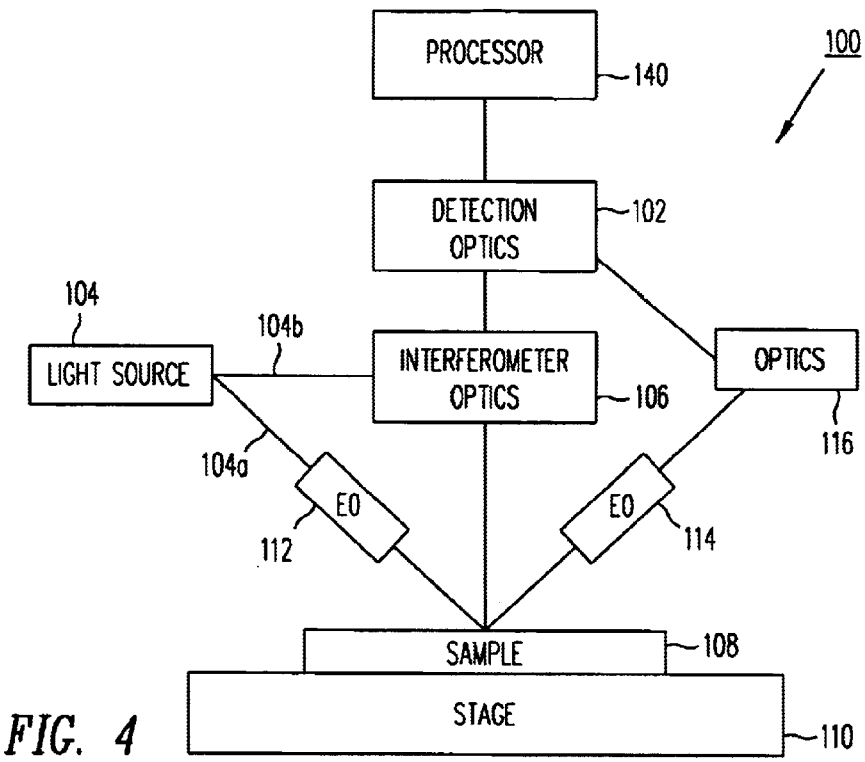
FIG. 4 shows a block diagram of a metrology tool with an interferometer and an ellipsometer sharing many of the same components in accordance with an embodiment of the present invention.

FIG. 4 shows a block diagram of a metrology tool 100 with an interferometer and an ellipsometer sharing a number of the same components in accordance with an embodiment of the present invention.

The single light source 104 may include a single laser, or two or more actual lasers. In the case of spectroscopic measurements, a plurality of lasers within light source 104 may be desirable because most lasers emit radiation over a limited spectral range.

Thus, the use of a plurality of lasers may increase the spectral range of the emitted radiation. This is particularly advantageous for a spectroscopic ellipsometer that uses multiple wavelengths of light over a wide range.

It should be understood that light source 104 may include one or more broad band lamps. However, such an embodiment would require additional components such as a monochronomator or spectrograph, which are well known in the art for making the spectroscopic interferometer and ellipsometer measurements.

Figure 5A:
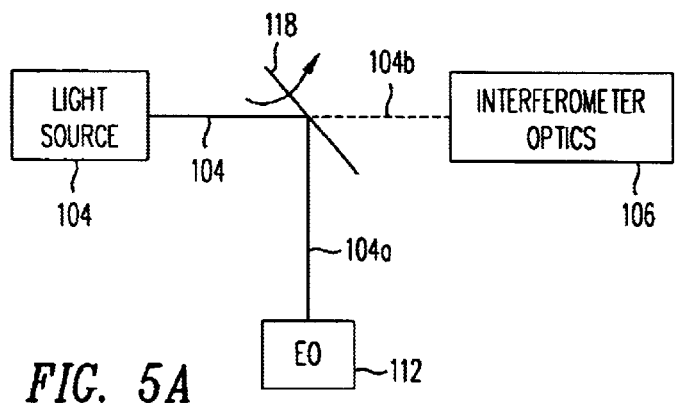
FIG. 5A shows a rotating mirror used to alternately switch the beam between the interferometer optics and the ellipsometer optics.
Figure 5B:
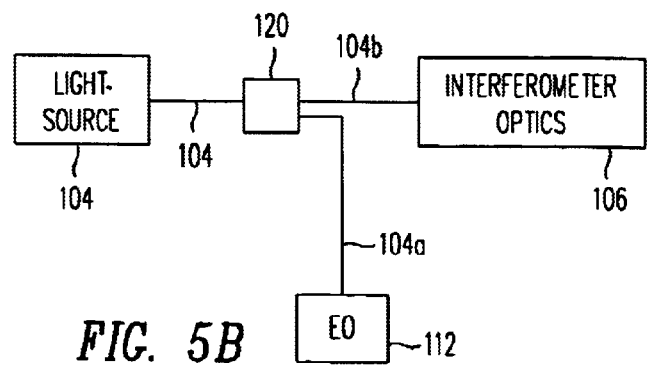
FIG. 5B shows an optical coupler to form the light beams for the interferometer and ellipsometer.

The light source 104 may produce a single light beam that is split by a beam splitting prism into two beams, a light beam for an interferometer 104b being directed towards the interferometer optics 106 and a light beam for an ellipsometer 104a being directed toward the ellipsometer optics 112. Further, FIGS. 5A and 5B show exemplary parts of metrology tool 100 for producing the two beams 104a and 104b. As shown in FIG. 5A, a moving mirror 118 could be used to alternately switch the beam between the ellipsometer optics and the interferometer optics. Similarly, a fixed beam splitter and two shutters in the path of beams 104a and 104b can be used instead of the moving mirror. In another embodiment, as shown in FIG. 5B, an optical coupler 120, such as a bifurcated fiber optics, is used to form the two beams 104a and 104b. In another embodiment, simply collecting the light emitted from the light source 104 in different directions may form the two beams 104a and 104b. Further, solid state beam diverters may be used to divide a single light beam from light source 104 to create light beams 104a and 104b for the interferometer and ellipsometer.

The light beam for an interferometer 104b and the light beam for an ellipsometer 104a may be directed to the detection optics 102 with elements similar to those used to produce or direct beams 104a and 104b. For example, a beam splitting prism or an optical coupler may be used to direct the beams 104a and 104b towards the detection optics 102.

As shown in FIG. 4, light beam 104b is directed by interferometer optics, which an may include a beam splitter, a Wollaston prism, and focusing lenses, towards sample 108, which is held in place on stage 110. Light beam 104b is directed towards sample 108 at normal incidence. Light beam 104b is reflected off sample 108 and passes through interferometer optics 106 to detection optics 102.

It should be understood that many different types and or configurations of the interferometer optical elements might be used.

Light beam 104a is directed towards the ellipsometer optics 112, which may include a polarizer, beam splitter, and focusing lenses, which polarizes the light beam 104a in a predicted way. Reflection of light beam 104a from sample 108 changes the polarization state of light beam 104a. The light beam 104a then passes through the ellipsometer optics 114. The beam 104a is then directed to the detection optics 102 via optics 116 and analyzed by processor 140.

It should be understood that many different types and or configurations of the ellipsometer optical elements might be used. There are many ellipsometer designs such as those disclosed in U.S. Pat. Nos. 5,329,357 and 5,877,859, all of which are incorporated by reference.

If desired, additional systems and optics, such as a display and autofocus may be incorporated into the system.

Figure 6:
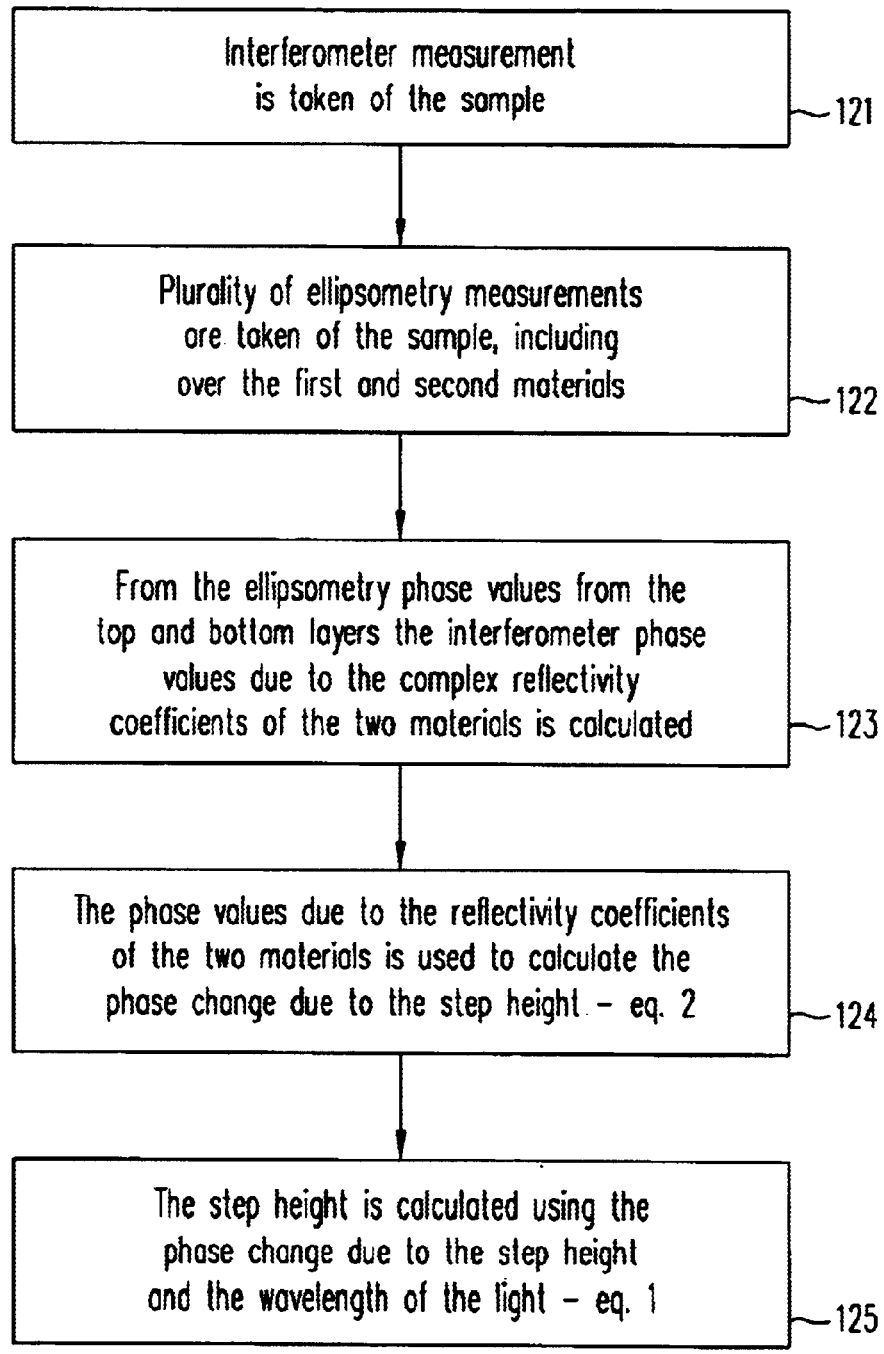
FIG. 6 is a flow chart of the process of determining the step height h between two regions on a sample or the profile of the surface region of the sample.
Figure 7A:
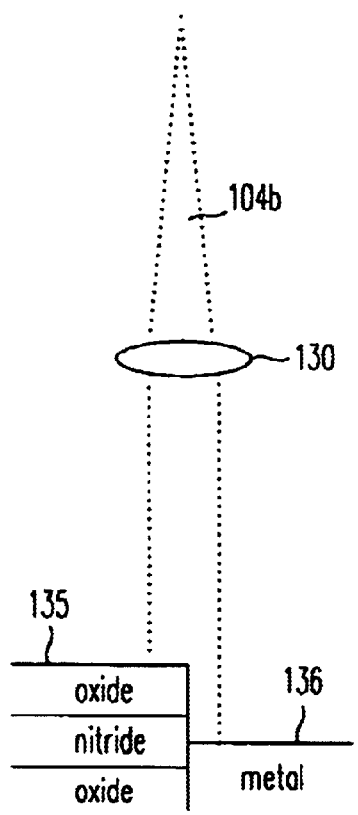
FIG. 7A is a cross-sectional view of a sample with a step that is being measured by a differential interferometer.
Figure 7B:
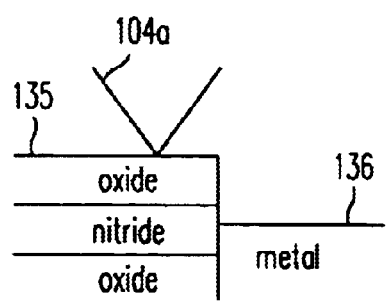
FIG. 7B is a cross-sectional view of a sample with a step, where the top of the step is being measured by an ellipsometer.
Figure 7C:
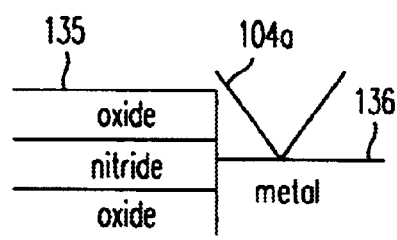
FIG. 7C is a cross-sectional view of a sample with a step, where the bottom of the step is being measured by an ellipsometer.

FIG. 6 is a flow chart of the process of determining the step height h between two regions on a sample or the profile of the surface region of the sample according to one embodiment FIGS. 7A through 7C are schematic diagrams of some of the blocks described in FIG. 6 and will therefore be referred to in conjunction with the description of FIG. 6. As described in FIG. 6 (at block 121), at least one interferometer measurement is made of the sample 108, for example, at the step. As can be seen in FIG. 7A, light beam 104b is split into two beams by a beam splitter. For example, light beam 104b can be divided into two components, s and p, by a Wollaston prism (not shown). A lens 130 then directs the two beams onto the two different heights of the step. The beams are then reflected back up and recombined in the interferometer optics 106 (FIG. 4), and a phase difference θ, is measured by the detector optics 102 (FIG. 4).

The phase difference θ, measured by the detector is insufficient alone to calculate the step height because θ is the phase difference due the step height ($\phi_h$) plus the phase difference due to the different reflectivity coefficients of the top and bottom materials ($\phi_{mat1}$ and $\phi_{mat2}$). Thus, the reflectivity coefficients of the two materials are needed to calculate an accurate step height.

Next, a plurality of ellipsometer measurements of the material is made at the same or approximately the same location as the interferometer measurement was taken. It is not necessary that the ellipsometer measurement be taken at precisely the same location as the interferometer, so long as it is taken close enough to measure the reflectivity coefficient of the materials on the top and bottom of the step, and that the materials are fairly uniform on composition, thickness, and flatness. As shown in FIG. 7B, light beam 104a that has been polarized in a known polarization state is first reflected from the top step surface 135 of sample 108, which in FIGS. 7A through 7C is an oxide layer. The reflected light is received by detection optics 102 and analyzed by processor 140 to determine a first ellipsometry angles pair $\Delta_1$ and $\psi_1$.

A similar ellipsometer measurement of the material at the bottom of the step is taken. The ellipsometer must then be positioned to direct light beam 104a at the material at the bottom of the step, which in FIGS. 7A through 7C is a metal layer. This change in position can be achieved, for example, by moving stage 110 to realign the ellipsometer with the second material. As shown in FIG. 7C, light beam 104a, which has been polarized in a known polarization state is reflected from the bottom step surface 136 of sample 108. The reflected light is received by detection optics 102 and analyzed by processor 118 to determine a second ellipsometry angles $\Delta_2$ and $\psi_2$.

Next, the two ellipsometry measurements ($\Delta_1$, $\psi_1$) and ($\Delta_2$, $\psi_2$), are used to calculate the two phase values, $\phi$ and $\phi_2$, due to the complex reflectivity coefficients of the two materials in equation 2 (block 123). An ellipsometer measurement is advantageous to determine the reflective coefficients as compared to a spectroscopic reflectometer because it is more sensitive to a phase measurement. Further, the relationship between the interferometry phases ($\phi_{mat1}$ and $\phi_{mat2}$) and ellipsometry phases ($\Delta_1$, $\psi_1$ and $\Delta_2$, $\psi_2$) is a more direct correlation than with a spectroscopic reflectometer measurement.

The phase values, ($\psi_{mat1}$, and $\psi_{mat2}$, are therefore found by using optical models of the two materials and the measured values of $\Delta_1$, $\psi_1$ and $\Delta_2$, $\psi_2$, to correct the dielectric functions of the materials. These corrected dielectric functions can then be used to calculate the phase values $\psi_{mat1}$ and $\psi_{mat2}$, for use in equation 2.

The calculations for calculating the phase values are well known in the art. For example, such calculations are disclosed by F. Abeles in Progress in Optics, Vol. II, E. Wolf, Ed. (North Holland Publishing, Amsterdam, 1963), pp. 248–288, which is incorporated herein by reference in its entirety.

Next, the calculated phase values due to the reflectivity coefficients of the two materials $\psi_1$ and $\psi_2$, calculated from block 123, and the phase measured by the interferometer in block 121, θ, are used to calculate $\psi_h$, using equation 2 (block 124).

Finally, the height of the step is calculated using $\psi_h$, calculated in block 124, and the wavelength of the light used in the interferometer measurement in equation 1 (block 125).

It should be noted that the blocks 121–125 do not need to be followed in precisely the order in which they are displayed in FIG. 6. For example, the ellipsometer measurements of block 122, may be taken prior to the interferometer measurement of block 121.

Figure 8:
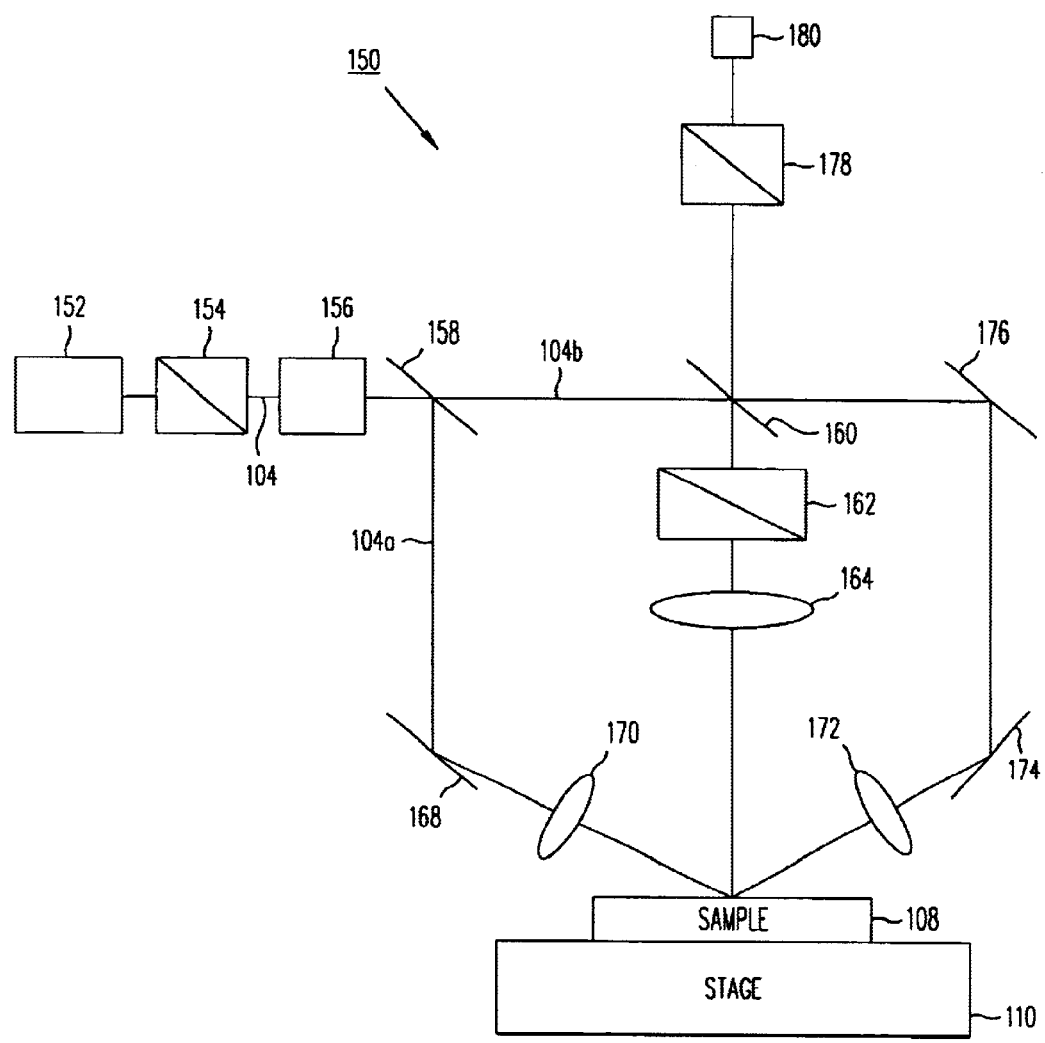
FIG. 8 shows a metrology tool, which includes an interferometer-ellipsometer combination, in accordance with an embodiment of the present invention.

FIG. 8 shows a more detailed schematic view of metrology tool 150, which includes an interferometer-ellipsometer combination, in accordance with an embodiment of the present invention.

The light source 152 for both the ellipsometer measurement and the interferometer measurement is, e.g., a laser or a broad band light source. The light beam 104 is emitted from light source 152 and passes through polarizer 154 and elastic modulator 156. Light beam 104 passes from light source 152 through polarizer 154 and elastic modulator 156 such that it modulates the light polarization at a known frequency ω. The light beam 104 is then divided into beams 104a and 104b by beam splitter 158 to be used by the ellipsometer and interferometer respectively. Thus both the ellipsometer and interferometer share in addition to the light source 152, a polarizer 154, and elastic modulator 156.

The light beam 104b for the interferometer measurement is deflected by beam splitter 160 and passes through Wollaston prism 162. The light beam 104b is then divided into two components, s and p, by the Wollaston prism 162, which are polarized perpendicular to each other. This creates two light beams that can interfere with each other after reflection off a surface with different heights. The two beams created by the Wollaston prism 162 are directed onto the sample 108 by the objective lens 164. The light beam 104b is reflected back through the lens 164, is recombined by Wollaston prism 162, through beam splitter 160, a second polarizer 178 (or analyzer) and to detector 180. Processor 140 then measures the intensity of the light as a function of time as shown in FIG. 2 to calculate θ.

The ellipsometer measurement is performed using a number of the same components that were used in taking the interferometer measurement. The light source for both the ellipsometer measurement and the interferometer measurement is the shared light source 152. In addition, this embodiment of the interferometer-ellipsometer combination shares polarizer 154 and elastic modulator 156.

Light beam 104a is deflected by mirror 168 and focused by lens 170 to strike the sample 108 surface at an oblique angle. Light beam 104a is reflected off of sample 108 and passes through collimating lens 172. Light beam 104a is then directed to the detector 180 by mirrors 174, 176, and beam splitter 160. Light beam 104a finally passes through polarizer 178 (analyzer) to the detector 180. Detector 180 then measures the change in the polarization of the light beam 104a for use in calculating the reflectivity coefficient.

Therefore, in addition to sharing the light source 152, polarizer 154 and elastic modulator 156, the ellipsometer and interferometer also share the polarizer 178 (analyzer) and detector 180 components.

It should be understood that other conventional interferometer and ellipsometer optical elements, which are well known to those of ordinary skill in the art, may be used. Of course, because a small metrology tool is desired, it is convenient to use a small interferometer and ellipsometer and to keep the overall optical paths as small as possible. In addition, it should be understood that the specific number of optical lenses shown in FIG. 8 (and other FIGS.) are for illustrative purposes and that fewer or more lenses may actually be employed.

Figure 9:
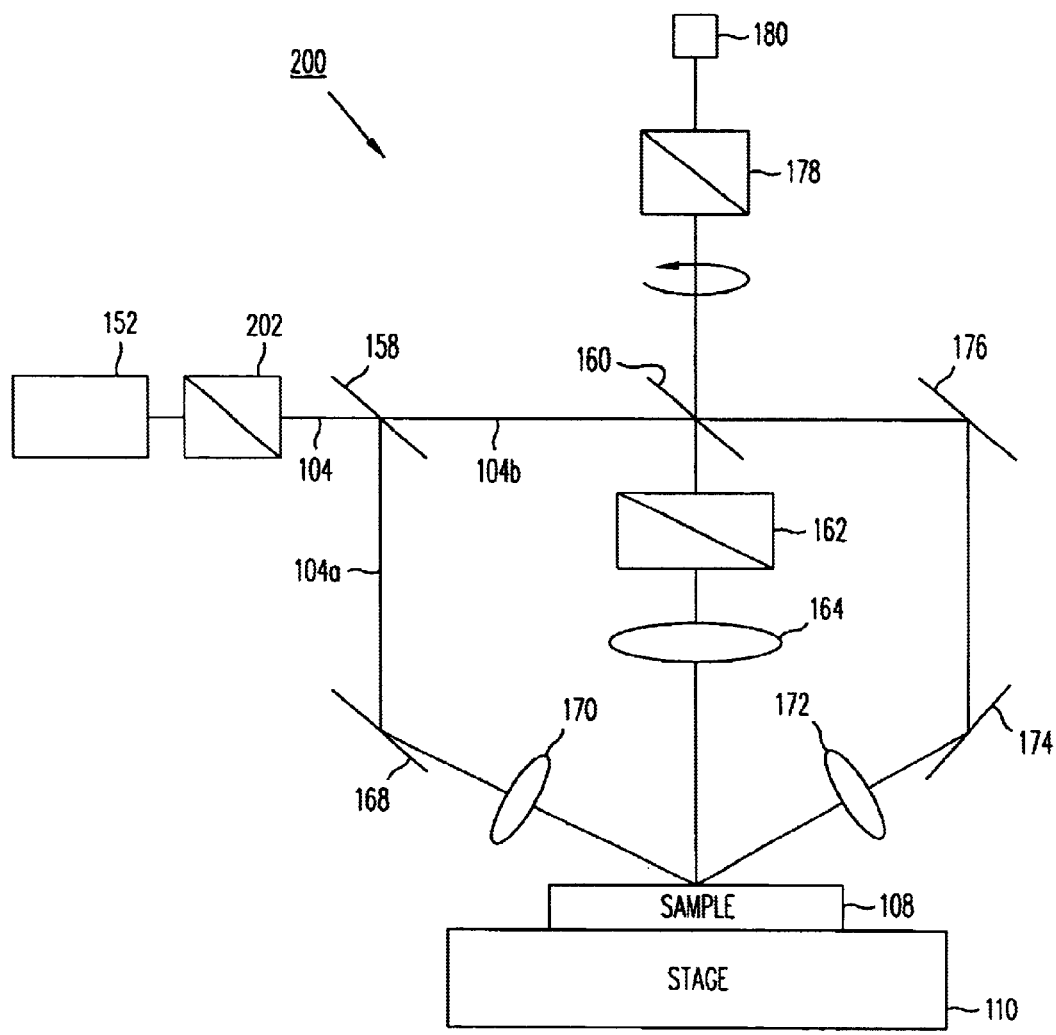
FIG. 9 shows another embodiment of a metrology tool, which includes an interferometer-ellipsometer combination.

FIG. 9 shows a detailed schematic view of a metrology tool 200, which includes an interferometer-ellipsometer combination, in accordance with an embodiment of present invention. Metrology tool 200 is similar to metrology tool 150 of FIG. 6 and is labeled with many similar reference numbers. Accordingly, to avoid redundancy, the discussion will focus on the differences between metrology tool 200 and metrology tool 150.

Metrology tool 200 includes a rotating polarizer 202 placed in the path of light beam 104 before being divided into beams 104a and 104b, whereas metrology tool 150 of FIG. 6 has a polarizer 154 and elastic modulator 156 to polarize light beam 104. In Metrology tool 200, either polarizer 202 or polarizer 178 rotates continuously, and detector 180 collects data synchronously with the rotation of polarizer 202 or 178. The intensity collected by detector 180 as a function of time is a sinusoidal function, which can be analyzed to extract the interferometer and ellipsometer parameters. In this embodiment the interferometer and ellipsometer combination share several components, for example light source 152, rotating polarizer 202, polarizer 178 (analyzer), and detector 180.

It should be noted that either polarizer 202 or analyzer 178 can be rotated within metrology tool 200. Determining whether to rotate polarizer 202 or analyzer 178 depends in part on the final design of metrology tool 200. If a polarized light source such as a laser is used it is preferred to rotate analyzer 178. However, if the light source is unpolarized and the detector 180 is polarization sensitive, for example if a grating is used, then it is preferred to rotate the polarizer 202.

Figure 10:
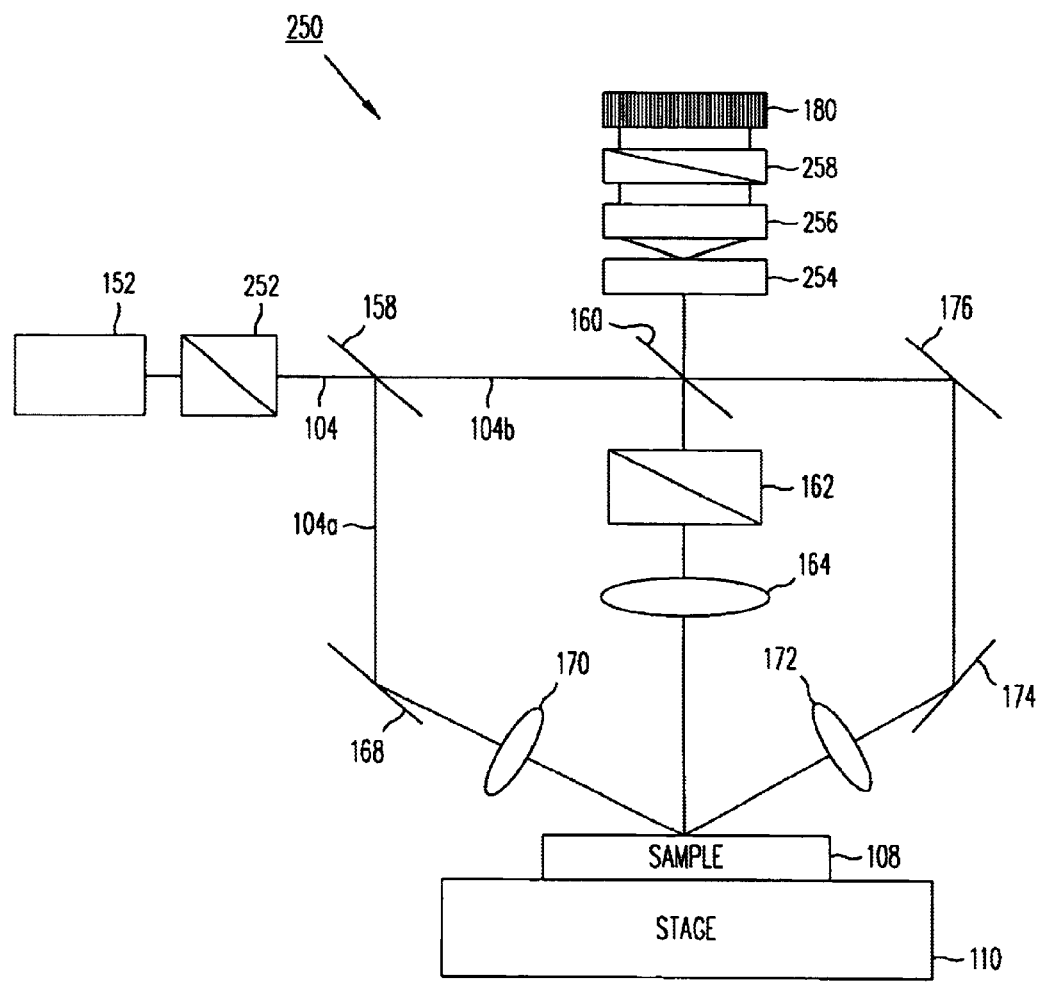
FIG. 10 shows another embodiment of a metrology tool, which includes an interferometer-ellipsometer combination.

FIG. 10 shows a detailed schematic view of metrology tool 250, which includes an interferometer-ellipsometer combination in accordance with an embodiment of the present invention. Metrology tool 250 consists of an interferometer-ellipsometer combination with no moving parts. Metrology tool 250 is similar to metrology tool 150 and 200, of FIGS. 8 and 9 and is labeled with many similar reference numbers. Accordingly, to avoid redundancy, the discussion will focus on the differences between metrology tool 250 and metrology tools 150 and 200.

Light beam 104, produced by shared light source 152, first passes through polarizer 252. Light beams 104a and 104b follow paths similar to that of metrology tool 150 and 200 until after they pass through, or are deflected by, beam splitter 160 towards the detector 180. In this embodiment however, the light beams for both the interferometer and ellipsometer pass through a common or shared beam expander 254, variable retarder 256, and polarizer 258 before reaching detector array 180. This embodiment further shares the light source 152 and polarizer 252

Variable retarder 256 may be for example the instrument described in U.S. Pat. application Ser. No. 09/929,625 entitled, "Metrology Device and Method using a Spatial Variable Phase Retarder", filed on Aug. 13, 2001 by Pablo I Rovira and Jaime Pores, which is incorporated by reference in its entirety.

The above detailed descriptions are provided to illustrate specific embodiments of the present invention and are not intended to be limiting. Numerous modifications and variations within the scope of the present invention are possible. For example, it should be understood that FIGS. 4 and 8–10 show different embodiments of the optical paths and that any combination of elements and optical paths may advantageously be used. Moreover, the optical paths of the interferometer and ellipsometer and the position of the detection optics may be interchanged such that the light beam for an ellipsometer is received directly by the detection optics, while the light beam for an interferometer is redirected using e.g., mirrors or fiber optic bundles to the detection optics. The optical paths of the light beams may include beam splitters, moving mirrors, optical couplers and fiber optics cables, including single or multiple bundles of cables, or solid state beam diverters. Therefore, the spirit and scope of the appended claims should not be limited to the description of the versions depicted in the figures.

We claim:

1. An apparatus for measuring a height of a step sample, said apparatus comprising:

a light source providing a light beam for an interferometer and a light beam for an ellipsometer;

interferometer optics for directing said light beam for an interferometer to reflect off a sample, wherein the interferometer optics comprise a beam splitter that splits said light beam for the interferometer into two light beams both of which are reflected off the sample;

ellipsometer optics for directing said light beam for an ellipsometer to reflect off said sample; and a detector element for receiving the reflected light beam for an interferometer and the reflected light beam for an ellipsometer.

2. The apparatus of claim 1, wherein the light source is a laser that generates a monochromatic light beam.

3. The apparatus of claim 1, wherein the light source comprises at least one lamp.

4. The apparatus of claim 1, wherein said light source produces a single light beam, said apparatus further comprising a second beam splitter that splits said single light beam into said light beam for an interferometer and said light beam for an ellipsometer.

5. The apparatus of claim 1, wherein the light source produces a single light beam, said apparatus further comprising a moveable mirror that directs said single light beam to be said light beam for an interferometer and said light beam for an ellipsometer.

6. The apparatus of claim 1, wherein the light source produces a single light beam, said apparatus further comprising an optical coupler that divides said singe light beam to be said light beam for an interferometer and said light beam for an ellipsometer.

7. The apparatus of claim 1, wherein said light source simultaneously produces both said light beam for an interferometer and said light beam for an ellipsometer.

8. The apparatus of claim 1, wherein said apparatus further comprises a beam splitter to direct both said reflected light beam for an interferometer and said reflected light beam for an ellipsometer to said detector element.

9. The apparatus of claim 1, wherein said apparatus further comprises an optical coupler to direct both said reflected light beam for an interferometer and said reflected light beam for an ellipsometer to said detector element.

10. The apparatus of claim 1, wherein said interferometer optics and said ellipsometer optics share at least one polarizer.

11. The apparatus of claim 1, wherein said interferometer optics and said ellipsometer optics share at least one analyzer.

12. The apparatus of claim 1, wherein at least one of said light beam for an interferometer and said light beam for an ellipsometer pass through a variable retarder.

13. A metrology tool with an interferometer and an ellipsometer, said metrology tool comprising:

means for producing a light beam for an interferometer;

means for producing a light beam for an ellipsometer;

interferometer optics for directing said light beam for an interferometer onto a sample, wherein the interferometer optics comprise a beam splitter that splits said light beam for the interferometer into two light beams both of which are reflected off the sample;

ellipsometer optics for directing said light beam for an ellipsometer onto a sample; and a means for receiving and detecting both the reflected light beam for an interferometer and the reflected light beam for an ellipsometer.

14. The metrology tool of claim 13, wherein said means for producing a light beam for an interferometer and said means for producing a light beam for an ellipsometer is a single light source that produces said light beam for an interferometer and said light beam for an ellipsometer.

15. The metrology tool of claim 14, said single light source produces a single light beam and wherein said means for producing a light beam for an interferometer and said means for producing a light beam for an ellipsometer is a single light source further includes a second beam splitter for splitting said single light beam into said light beam for an interferometer and said light beam for an ellipsometer.

16. The metrology tool of claim 13, wherein said means for receiving and detecting both the reflected light beam for an interferometer and the reflected light beam for an ellipsometer is a single detector element.

17. A method of measuring the step height of a sample, said method comprising:

producing a light beam directing said light beam into an interferometer path;

directing said light beam into an ellipsometer path;

splitting the light beam in the interferometer path into two light beams;

reflecting the two light beams in the interferometer path off said sample;

combining the two reflected light beams into one reflected light beam:

reflecting the light beam for an ellipsometer off said sample; and receiving the reflected light beam for an interferometer and the reflected light beam for an ellipsometer at the same detector element.

18. The method of claim 17, wherein producing said light beam for an interferometer and said light beam for an ellipsometer comprises:

providing a single light beam from a light source; and splitting said single light beam from said light source into said light beam for an interferometer and said light beam for an ellipsometer.

19. The method of claim 17, wherein producing said light beam for an interferometer and said light beam for an ellipsometer comprises combining light having a first set of wavelengths from a first lamp in a light source with light having a second set of wavelengths from a second lamp in said light source.

20. An apparatus for measuring a step height of a sample, said apparatus comprising:

a light source;

a polarizer to polarize a light beam emitted from said light source;

said light beam providing a light beam for an interferometer and a light beam for an ellipsometer, interferometer optics disposed to receive said light beam for an interferometer, wherein the interferometer optics comprise a beam splitter that splits said light beam for the interferometer into two light beams and directs said two light beams for an interferometer to reflect off said sample and combines the two reflected light beams into one reflected light beam;

ellipsometer optics disposed to receive said light beam for an ellipsometer and direct said light beam for an ellipsometer to reflect off said sample;

an analyzer disposed downstream of said interferometer optics and ellipsometer optics to analyze said one reflected light beam and said light beam for an ellipsometer after being reflected off said sample; and a detector element for receiving the light beam for an interferometer and the light beam for an ellipsometer after passing through the analyzer.

21. The apparatus of claim 20, further comprising a second beam splitter that splits said single light beam into said light beam for an interferometer and said light beam for an ellipsometer.

22. The apparatus of claim 20, further comprising a movable mirror that directs said single light beam to be said light beam for an interferometer and said light beam for an ellipsometer.

23. The apparatus of claim 20, further comprising an optical coupler that directs said single light beam into said light beam for an interferometer and said light beam for an ellipsometer.

24. The apparatus of claim 20, wherein the light source is a laser that generates a collimated monochromatic light beam.

25. The apparatus of claim 20, wherein the light source comprises one or more lamps.

* * * * *